United States Patent
Pillai et al.

(10) Patent No.: US 11,620,818 B2
(45) Date of Patent: Apr. 4, 2023

(54) SPATIALLY SPARSE NEURAL NETWORK ACCELERATOR FOR MULTI-DIMENSION VISUAL ANALYTICS

(71) Applicant: Intel Corporation, Santa Clara, CA (US)

(72) Inventors: Kamlesh Pillai, Bangalore (IN); Gurpreet Singh Kalsi, Bangalore (IN); Sreenivas Subramoney, Bangalore (IN); Prashant Laddha, Bengaluru (IN); Om Ji Omer, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/131,121

(22) Filed: Dec. 22, 2020

(65) Prior Publication Data

US 2021/0110187 A1    Apr. 15, 2021

(51) Int. Cl.

| | |
|---|---|
| *G06V 10/94* | (2022.01) |
| *G06F 7/544* | (2006.01) |
| *G06N 3/04* | (2023.01) |
| *G06T 1/60* | (2006.01) |
| *G06K 9/62* | (2022.01) |
| *G06V 20/64* | (2022.01) |

(52) U.S. Cl.
CPC .......... *G06V 10/955* (2022.01); *G06F 7/5443* (2013.01); *G06K 9/629* (2013.01); *G06K 9/6249* (2013.01); *G06N 3/04* (2013.01); *G06T 1/60* (2013.01); *G06V 20/64* (2022.01)

(58) Field of Classification Search
None
See application file for complete search history.

(56) References Cited

U.S. PATENT DOCUMENTS

| | | | |
|---|---|---|---|
| 11,164,032 B2* | 11/2021 | Rao | G06K 9/6261 |
| 11,221,929 B1* | 1/2022 | Katz | G06F 11/1004 |
| 11,237,894 B1* | 2/2022 | Baum | G06F 11/0721 |
| 11,263,077 B1* | 3/2022 | Seznayov | G06F 3/064 |
| 2014/0023010 A1* | 1/2014 | Loehr | H04W 52/365 370/329 |
| 2021/0343087 A1* | 11/2021 | Gomez Gonzalez | G06F 16/338 |
| 2021/0357737 A1* | 11/2021 | Hamerly | G06N 3/0675 |
| 2021/0358164 A1* | 11/2021 | Liu | G06N 3/084 |

(Continued)

OTHER PUBLICATIONS

Y. Chen et al., "Eyeriss v2: A flexible accelerator for emerging deep neural networks on mobile devices," <arxiv.org/pdf/1807.07928.pdf>, May 20, 2019, 21 pages.

(Continued)

*Primary Examiner* — Anand P Bhatnagar
(74) *Attorney, Agent, or Firm* — Hanley, Flight & Zimmerman, LLC

(57) ABSTRACT

Systems, apparatuses and methods may provide for technology that decodes data via an instruction that indicates a number of rulebooks to be processed, an input feature size, an output feature size, and a plurality of feature map base addresses, rearranges spatially distributed voxel output feature maps in the decoded data based on weight planes, and performs a channel-wise multiply-accumulate (MAC) operation on the rearranged spatially distributed voxel output feature maps to obtain an output, wherein the channel-wise MAC operation is performed as partial accumulations by a plurality of processing elements.

25 Claims, 11 Drawing Sheets

(56) References Cited

U.S. PATENT DOCUMENTS

| 2021/0375358 | A1* | 12/2021 | Rom | G06N 3/0635 |
| 2022/0012578 | A1* | 1/2022 | Brady | G06N 3/063 |
| 2022/0067512 | A1* | 3/2022 | Khailany | G06F 17/16 |
| 2022/0067530 | A1* | 3/2022 | Khailany | G06F 7/523 |

OTHER PUBLICATIONS

X. Dong et al., ""Acorns: A framework for accelerating deep neural networks with input sparsity," in 2019 28th International Conference on Parallel Architectures and Compilation Techniques (PACT)," 2019, pp. 178-191.

A. Gondimalla et al., ""Sparten: A sparse tensor accelerator for convolutional neural networks," in Proceedings of the 52nd Annual IEEE/ACM International Symposium on Microarchitecture." ACM, 2019, pp. 151-165.

B. Graham et al., "3D semantic segmentation with submanifold sparse convolutional networks," in Proceedings of the IEEE Conference on Computer Vision and Pattern Recognition, 2018, pp. 9224-9232.

Y. Hu et al., "Taichi: a language for high-performance computation on spatially sparse data structures," ACM Transactions on Graphics (TOG),vol. 38, No. 6, pp. 1-16, 2019.

K. Kanellopoulos et al., "Smash: Co-designing software compression and hardware-accelerated indexing for efficient sparse matrix operations," in Proceedings of the 52Nd Annual IEEE/ACM International Symposium on Microarchitecture, ser. MICRO '52. New York, NY, USA: ACM, 2019, 15 pages.

A. Parashar et al., "SCNN: An accelerator for compressed-sparse convolutional neural networks," in 2017 ACM/IEEE 44th Annual International Symposium on Computer Architecture (ISCA). IEEE, 2017, 12 pages.

NVIDIA, "NVIDIA A100 Tensor Core GPU Architecture: Unprecedented Acceleration at Every Scale," <nvidia.com/content/dam/en-zz/Solutions/Data-Center/nvidia-ampere-architecture-whitepaper.pdf>, 2020, 82 pages.

Intel Corporation,"Intel Architecture: Instruction Set Extensions and Future Features Programming Reference," 165 pages, Jun. 2020.

N. Jouppi et al., "In-Datacenter Performance Analysis of a Tensor Processing Unit," in 2017 International Symposium on Computer Architecture (ISCA) Jun. 2017, <arxiv.org/ftp/arxiv/papers/1704/1704.04760.pdf>, 17 pages.

Liu et al., "Systolic Tensor Array: An Efficient Structured-Sparse GEMM Accelerator for Mobile CNN Inference," IEEE Computer Architecture Letters, vol. 19, No. 1, Jan.-Jun. 2020, 4 pages.

* cited by examiner

SPATIALLY SPARSE NEURAL NETWORK ACCELERATOR FOR MULTI-DIMENSION VISUAL ANALYTICS

CROSS-REFERENCE TO RELATED APPLICATIONS

The present application claims the benefit of priority to Indian Provisional Patent Application No. 202041042682 filed on Oct. 1, 2020.

TECHNICAL FIELD

Embodiments generally relate to neural network accelerators. More particularly, embodiments relate to spatially sparse neural network accelerators for multi-dimension visual analytics.

BACKGROUND

Semantic segmentation and completion of real-world scenes is a foundational primitive of three-dimensional (3D) visual perception widely used in high-level applications such as robotics, medical imaging, autonomous driving and navigation. Compute and memory requirements, however, for 3D visual analytics may grow in cubic complexity with voxel resolution, posing an impediment to realizing real-time energy-efficient deployments.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION OF EMBODIMENTS

Figure 1:
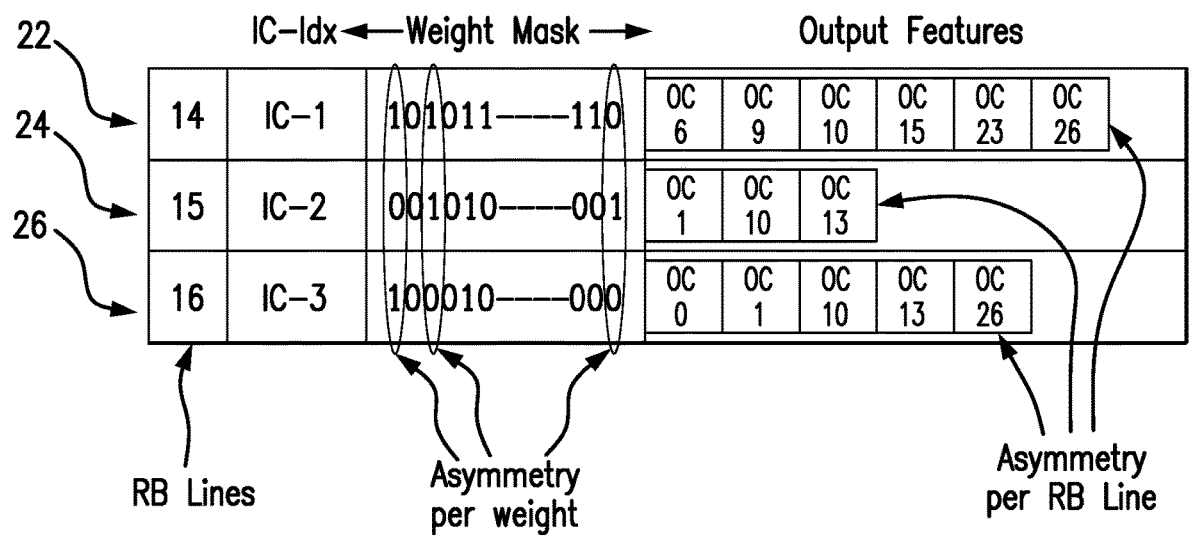
FIG. 1 is an illustration of an example of a rulebook line format according to an embodiment.

In 3D visual analytics scenarios, it becomes increasingly important to exploit data sparsity whenever possible in order to reduce the computational resources involved in data processing. Traditional convolution network implementations and corresponding accelerators may be optimized for data that resides on densely populated grids.

Commercial deep neural network (DNN or DeNN) accelerators such as Tensor Processing Unit (TPU from GOOGLE) and Tensor Core (from NVIDIA) may employ dense two-dimensional arrays optimized for very regular dataflows. Generic sparse accelerators may be specialized for two-dimensional (2D) arrays and accelerate the determination of element overlap. Sparse convolution processing, however, using such accelerators may be very inefficient.

For example, while conventional applications may have been mapped onto central processing units (CPUs, e.g., host processors) and graphics processing units (GPUs, e.g., graphics processors), performance may still be well below requirements for real-time usage. Indeed, attempts to address spatial sparsity may be compiler extensions for CPUs and GPUs. One conventional approach may offer a high-level interface to efficient data structures for spatially sparse data and generate code for sparse computation on CPUs and GPUs. Another conventional approach may generate a CPU implementation for sparse convolutions using a data layout and kernel template with improved loop tiling and vectorization.

These traditional convolutional network implementations may be optimized for data that is stored on densely populated grids and cannot process sparse data efficiently. More recently, several convolutional network implementations have been presented that may be tailored to work efficiently on sparse data. Mathematically, some of these implementations are identical to regular convolutional networks, but they require fewer computational resources in terms of floating point operations per second (FLOPs) and/or memory. Prior work uses a sparse version of an "im2col" operation that restricts computation and storage to "active" sites or uses a voting procedure to prune unnecessary multiplications by zeros.

Other solutions may use fixed function TMUL (tile matrix multiply) units that handle sparse data using a zero-detection block and skip the operation upon entry to the processing element (PE) stages. For storage, the solutions may use sparse compression algorithms such as CSR (Compression Sparse Row) and/or CSC (Compression Sparse Column). The solutions may also rely on zero-detection logic for handling sparse data. The solutions may cater, however, to 2D sparsity and do not apply to real-world 3D spatial sparsity, which is a basic characteristic of 3D visual understanding applications. Simply put, no hardware accelerators have been proposed to accelerate the fundamental 3D-sparse-convolution operation.

Accordingly, a significant disadvantage of prior sparse implementations of convolution networks is that they dilate the sparse data in every layer by applying full convolutions. Usage of zero-detection logic may result in hardware under-utilization, which is significant considering that, for example, each zero detected within the array may cause (1/array size) % underutilization.

For such 3D visual perception applications, embodiments provide an efficient scalable hardware solution without imposing a heavy burden on area and power penalty. More particularly, embodiments include an SSpNNA (Spatially Sparse Neural Network Accelerator) that can decode and efficiently process 3D sparse data (e.g., relationship between input feature maps/IFMs and output feature maps/OFMs corresponding to weight planes) encoded in a rulebook format. The technology described herein provides an end-to-end hardware solution for N-dimension visual analytics. Embodiment also include a new instruction to drive the hardware. The hardware may include two major blocks 1) a WAVES (Weight plane based Active Voxel Execution Scheduler) that performs formatting to rearrange the spatially distributed voxel OFMs and 2) a SyMAC (Systolic and Multicast based MAC Computation) that performs channel-wise computation and output element gathering. The proposed instruction may provide all required pointers to the SSpNNA for seamless processing. An advantage of the SSpNNA accelerator architecture is that it can significantly decrease the compute and memory requirements of execution of 3D visual analytics applications.

FIG. 1 shows a rulebook line format 20. In the illustrated example, a first rulebook line 22 specifies a weight mask ("101011----110") and a set of output feature indices (e.g., corresponding to valid output voxels in an output response field/ORF) for a first input channel index ("IC-1", e.g., corresponding to a first input voxel in an input receptive field/IRF). The positions of the 1's in the weight mask specify a weight to be used to determine the contribution of the first input voxel to each output feature. For example, the 1 value in the leftmost position indicates that weight $w_1$ is to be used to determine the contribution of IC-1 to the leftmost output feature index ("OC 6"), the 1 value in the third position from the left indicates that weight $w_3$ is to be used for the output feature index ("OC 9"), and so forth. Similarly, a second rulebook line 24 may specify a weight mask ("001010----001") and a set of output feature indices for a second input channel index ("IC-2") and a third rulebook line 26 may specify a weight mask ("100010----000") and a set of output feature indices for a third input channel index ("IC-3").

In the illustrated example, there is asymmetry per weight because, for example, weight $w_1$ is not used uniformly across all three rulebook lines 22, 24, 26. Additionally, there is asymmetry per rulebook line 22, 24, 26 because, for example, the number of output features in the first rulebook line 22 differs from the number of output features in the second rulebook line 24.

The SSpNNA described herein may accelerate N-Dimensional (e.g., variable number of dimensions greater than two) sparse processing compared to conventional solutions and increase the overall utilization of compute resources to approximately 90%. Along with supporting sparse processing, the hardware described herein may also work efficiently for dense workloads. For example, for a ScanNet (SCN) workload with thirty-nine layers, the hardware utilization ranges from 78.8% to 98.7%, while achieving an average utilization of approximately 93.20%. The hardware may also support dense neural network (NN) workloads by treating all bits in the bitmask (e.g., weight mask) to be set. This higher utilization is achieved by micro-architecture enhancements summarized as follows:

Waves:

N-Dimensional Spatially Sparse convolution—The microarchitecture is defined to process weight planes hierarchically, selecting a few planes to be processed at a time based on functional block area budget. This feature enables the design to operate beyond fixed convolutions. For example, for hardware with thirty-two weight planes, 3×3×3 convolutions (27 weight planes) may be processed together and 5×5×5 convolutions (125 weight planes) may be processed iteratively.

Dynamic resource allocation—a dynamic allocation of smaller chunks of memory based on sparsity may help in accommodating approximately 1.5× more rulebook (RB) lines (rb-lines) instead of storage being mapped as fixed resources per weight plane.

Input channel (IC) storage using index to reduce duplicate entries—an input-to-output (i2o) or output-to-input (o2i) feature mapping may be stored as pairs in per weight storage. To reduce the width of storage, the features (e.g., 32-bit floating point/FP number) may be stored into a static buffer and the corresponding indices (e.g., 8-bits) may be stored into data storage (e.g., index queues), which helps in reducing feature storage by approximately 75%.

Enable different types of the rulebook (i2o, o2i) using the same index buffer—the rulebook types (e.g., i2o type and o2i type) may be selected dynamically based on the application. For example, the index-based storage technology described herein enables both types to be scheduled by interchanging the data at the output of the index queue (e.g., keeping the entire WAVES design the same for both RB types).

SyMAC:

Microarchitecture for 3D sparse convolution—embodiments include a microarchitecture that shares weight data as a dynamic systolic array (e.g., a homogeneous network of tightly coupled data processing units/DPUs, cells and/or nodes). Additionally, input features may be multicast to multiple processing elements (e.g., performing accumulation of dot-product results) and output features may be partially accumulated. These enhancements make the technology applicable for different tile dimensions.

Recirculating buffer for maximum reuse of the IC data buffer—to increase the IFM reuse across multiple OFMs, an IC data buffer may be implemented as a recirculating buffer that provides IC values to multiple PEs in a DeNN.

Feature collision detection and accumulation—caching on output features and local accumulation to reduce level one (L1) cache bandwidth.

Implementation Details

Figure 2:
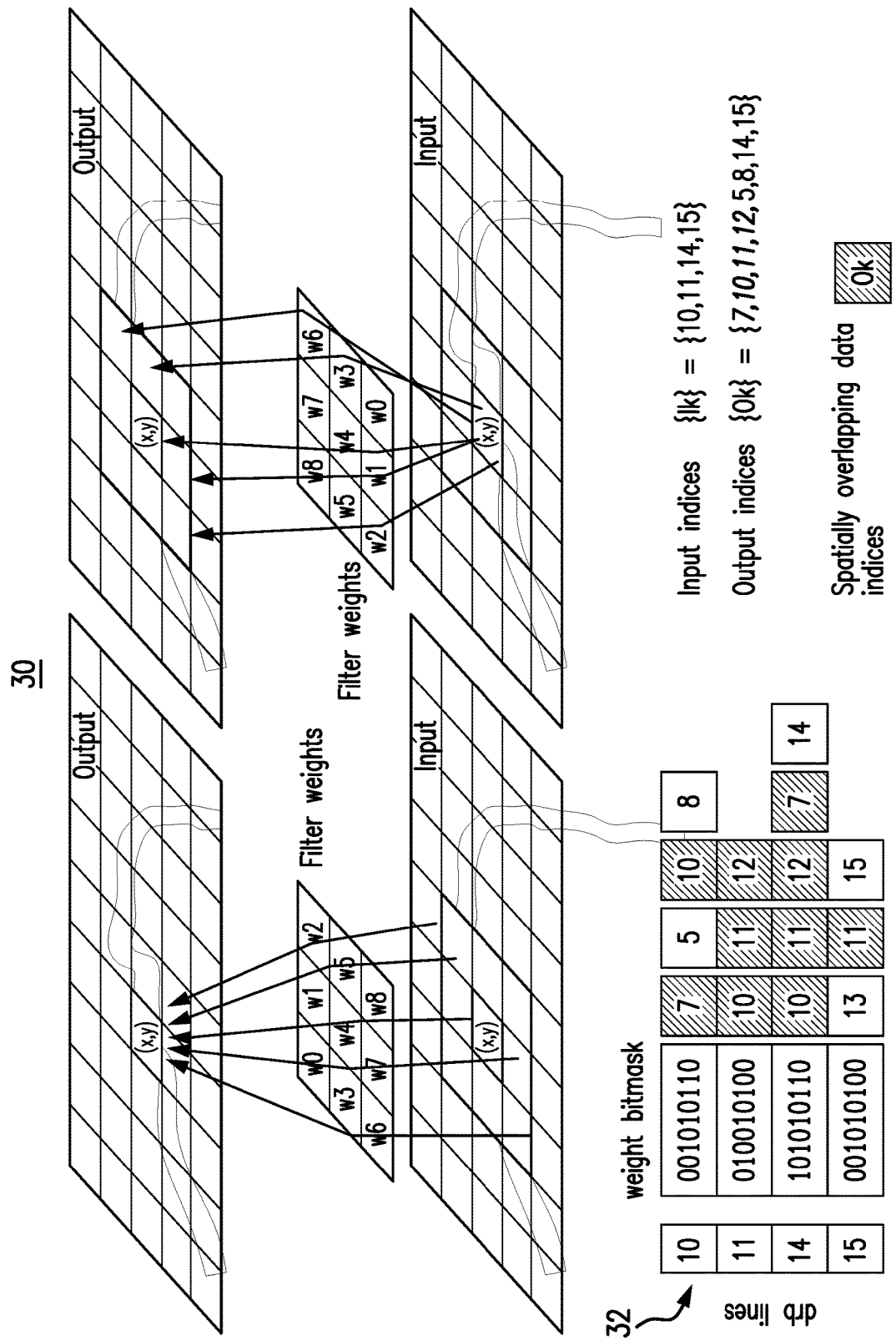
FIG. 2 is an illustration of an example of a rulebook creation procedure according to an embodiment.

FIG. 2 shows a creation procedure 30 for drb lines of a rulebook 32. In an embodiment, the encoding of the rulebook 32 may be of two types—i2o (input to output relationship) or o2i (output to input relationship). In the illustrated example, the rulebook 32 is encoded as an i2o data structure. Tiling is a process by which subsets of input voxels or output voxels and input or output channels (e.g., each subset known as a "tile") may be grouped and then processed in stages, saving memory and data accesses. A tile may be defined by a set of parameters: drb, dic, and doc, where drb refers to the number of rb-lines in the tile, and dic and doc refer to the number of input channels and output channels in the tile, respectively. An IFM tile consists of di input voxels, with each voxel having dic number of elements (e.g., channels). Similarly, an OFM tile contains do output voxels and doc elements (e.g., channels) per voxel. For the i2o rulebook 32, drb will be equal to di, and do may vary across tiles based on sparsity. For an o2i rulebook, drb will be equal to do, and di may vary across tiles based on sparsity.

For the purposes of discussion, a 2-D sparse convolution with a 3×3 filter may be used. An input at location (x; y) is stored at index i=10 and contributes to set of active outputs ORF10={7; 5; 10; 8} using weights {w1; w2; w4; w6}. The ORF10={oj} and the corresponding weight bitmask forms the first line in the i2o rulebook 32. Similarly, each line in the o2i rulebook 32 will have $IRF_n$={ij} along with weight bit masks for each output index $o_n$. The shaded boxes show an overlap of indices among drb lines.

Figure 3C:
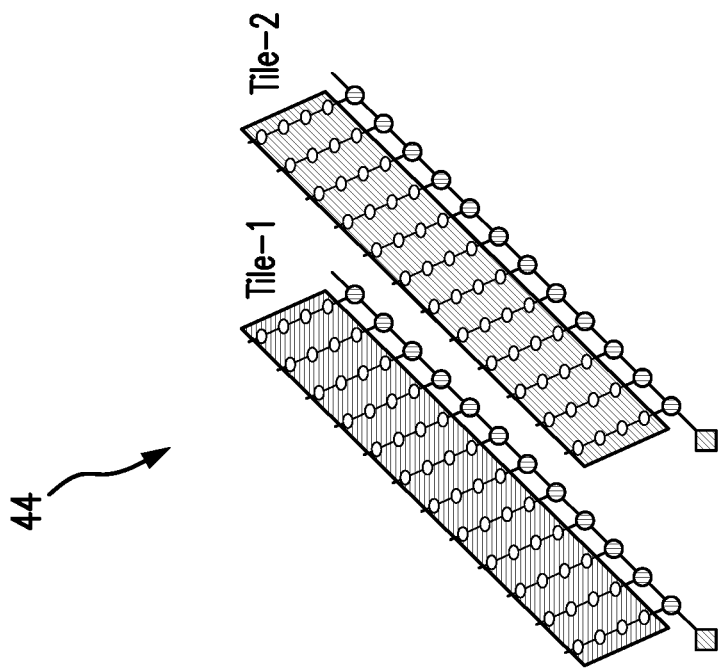
FIGS. 3A-3C are illustrations of examples of different tiling options according to embodiments.
Figure 3B:
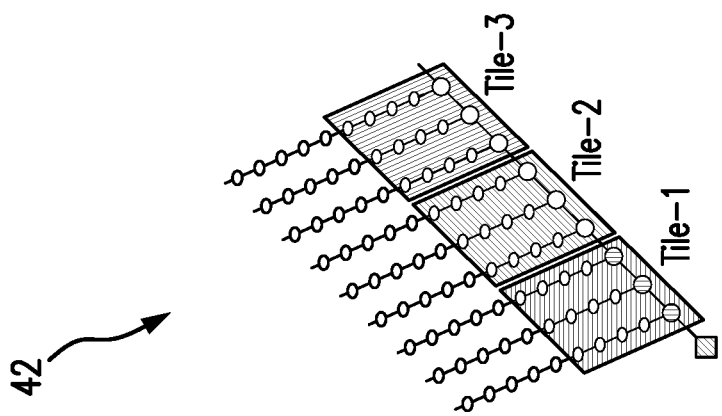
Figure 3A:
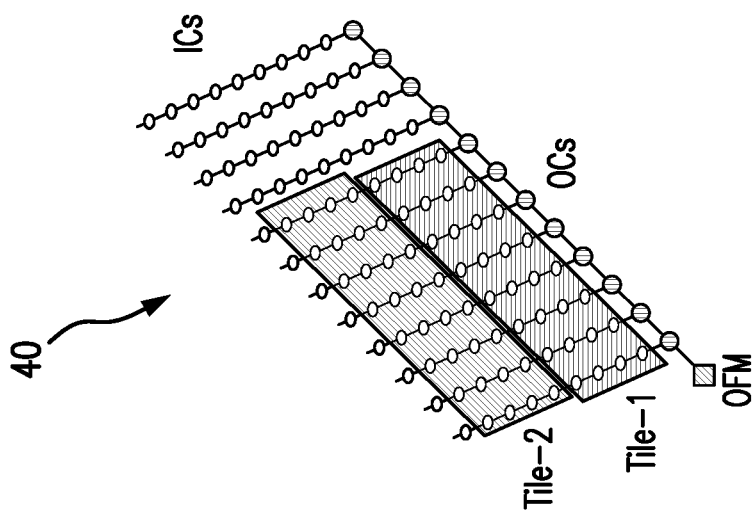

FIGS. 3A-3C demonstrate that a primary requirement for the hardware accelerator (HWA) is to work on a tile, where the relationships between IFMs and OFMs are defined using rulebook lines and sparsity across weight planes are encoded in a weight plane mask. Performing effective compute operations with these cross-tile variations involves variable data fetches per dimension while maximally exploiting internal data locality.

More particularly, FIG. 3A shows a first tiling option 40 in which the OC is shared across tiles. Accordingly, there may be a lesser number of rb-lines with a higher dic and a minimal doc. FIG. 3B shows a second tiling option 42 in which the IC is shared across tiles. In such a case, there may be a lesser number of rb-lines with a higher doc and a minimal dic. FIG. 3C shows a third tiling option 44 in which weights are shared across tiles. Accordingly, there may be a higher number of rb-lines with fewer dic and doc. The illustrated tiling orders may be dynamically selected by software based on the application data. Additionally, the HWA may be able to accelerate under all of the options 40, 42, 44 with limited memory bandwidth.

As already noted, the SSpNNA (Spatially SParse Neural Network Accelerator) hardware accelerator may include two major blocks (a) WAVES—Weight plane based Active Voxel Execution Scheduler, and (b) SyMAC—Systolic and Multicast based MAC Computation. In an embodiment, the SSpNNA automatically combines systolic and broadcast approaches while accumulating partial data locally.

Figure 4:
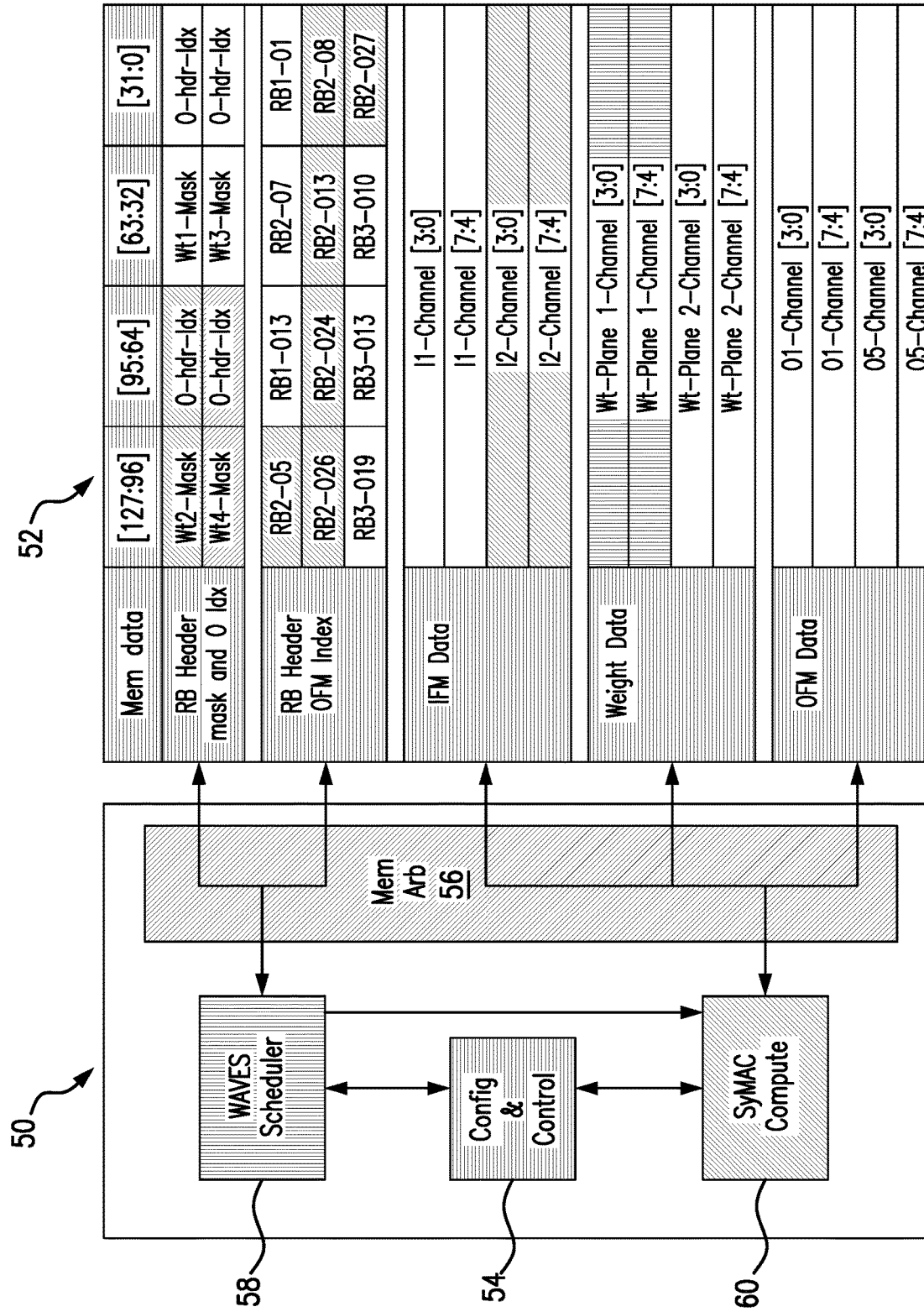
FIG. 4 is a block diagram of an example of a hardware accelerator (HWA) and a memory layout according to an embodiment.

FIG. 4 shows a SSpNNA HWA 50 and a memory layout 52. In the illustrated example, a configuration and control block 54 controls the overall execution and a memory arbiter 56 arbitrates memory requests and handles the interface protocol. A global event controller (not shown) may initiate the execution after loading the L1 cache and configuring the HWA 50 based on a new proposed instruction. Upon start, a WAVES scheduler 58 initiates an RB header fetch and performs reformatting of the workload according to weight planes. The WAVES scheduler 58 may schedule work to a SyMAC compute block 60, which performs channel-wise computations and output element gathering. Tile data organization is in L1-memory, which may be used as a scratchpad with, for example, a 16B interface. Considering a case of an i2o RB, an RB Header mask and O Index (output feature index/Idx) of the header gives an index to a list of OFM indices and a corresponding RB weight mask. The index to IFM is the index of the weight mask field, which may be stored linearly. An RB Header OFM Index gives indices to OFM element data stored in an OFM Data field. The Number of indices in the OFM Data field per RB may be decoded from the number of 1s in the corresponding weight mask. In an embodiment, these elements are packed densely to utilize all memory bits. The base addresses of the elements may be encoded in a new instruction and decoded accordingly for hardware to read corresponding values. IFM Data, Weight Data and OFM Data may be stored in any order provided that the RB header captures the indices accurately. In one example, elements are packed in multiples of four to match memory port bandwidth.

Figure 5:
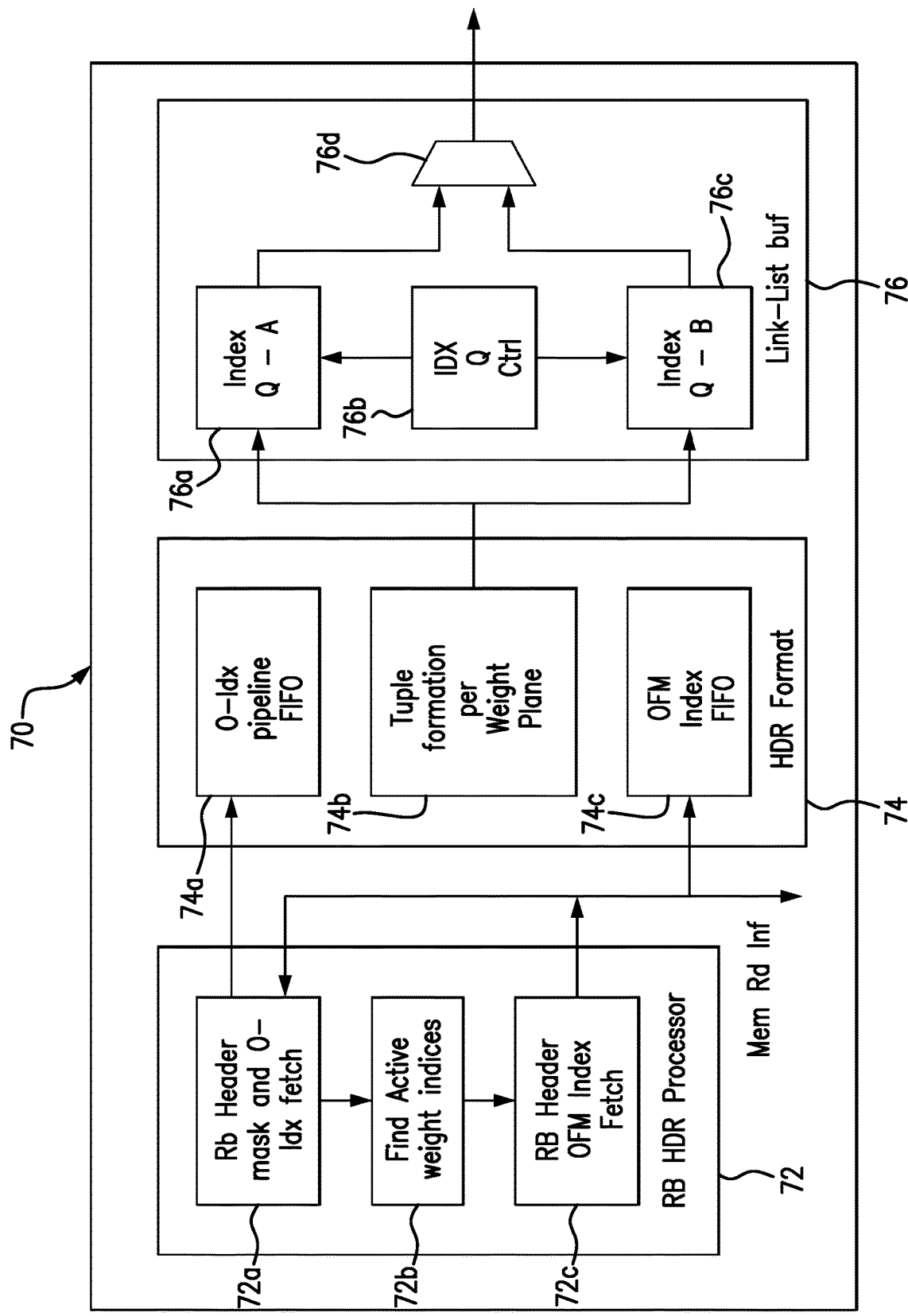
FIG. 5 is a block diagram of an example of a weight plane active voxel execution scheduler according to an embodiment.

FIG. 5 shows a WAVES scheduler 70 that operates based on an output of a rulebook creation procedure that encodes relationships between IFM and OFMs corresponding to weight planes. The WAVES scheduler 70 may be readily substituted for the WAVES scheduler 58 (FIG. 4), already discussed. In an embodiment, the WAVES scheduler 70 includes an RB header (HDR) processor 72 (72a-72c), a HDR Format 74 (74a-74c) and a linked-list buffer 76 (76a-76d). The operation of the WAVES scheduler 70 may begin with a first fetch block 72a fetching mask and O-Idx data, which provides a weight-wise OFM distribution and pointer to a list of OFM indices. Based on the number of 1s in the weight mask computed by a mask analyzer 72b, the respective number of OFM indices are fetched by a second fetch block 72c.

Fetched OFM indices may be stored in a FIFO (first in first out, e.g., static buffer) 74c and corresponding header information may be stored in a FIFO 74a (e.g., static buffer) to match memory read delays. In one example, a tuple formation block 74b combines multiple IFM-OFM pairs sharing the same weight plane. To match memory bandwidth of four FP (Floating Point) elements per cycle, the tuple formation block 74b may generate four tuples per cycle. The illustrated linked-list buffer 76 has index queues 76a, 76c to hold tuples prior to scheduling for computation and output via a multiplexer 76d. The index queues 76a, 76c are duplicated to hide header formation logic such that, for example, a first index queue 76a is active and scheduling a workload for computation while a second index queue 77c is collecting a formatted rulebook (e.g., and vice versa). The index queues 76a, 76c may be controlled by a queue controller 76b.

Figure 6:
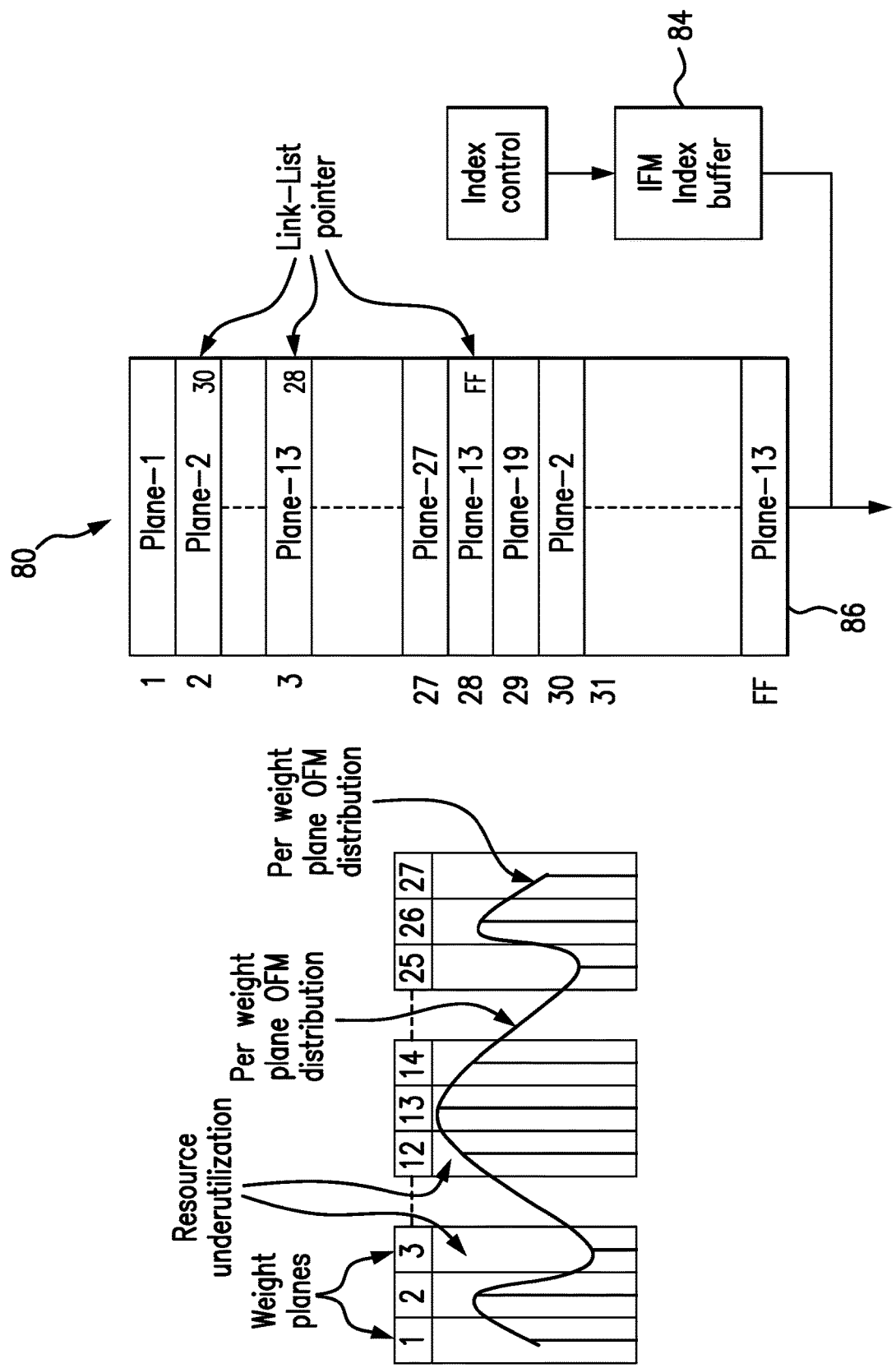
FIG. 6 is a comparative illustration of a fixed resources based index queue and a linked list based index queue according to an embodiment.

FIG. 6 shows a linked-list data structure 80 for a scheduler such as, for example, the WAVES scheduler 70 (FIG. 5). In the illustrated example, a fixed resource-based Index-Q 82 includes a wavy line to illustrate a dynamic distribution of active voxels in a receptive field. A filter property leads to symmetry around weight plane 13 but the SSpNNA can support any distribution. The vertical lines in the fixed resource-based Index-Q 82 represent the under-utilization as an effect of sparsity in the workload, if mappings were to be done via fixed hardware resources per plane. In SSpNNA, a link-list based storage approach is adopted to allocate resources dynamically and avoid hardware under-utilization. Thus, the link-list data structure 80 uses a linked-list based weight plane allocation. To further reduce storage, IFM indices are stored in an IFM Index buffer 84 and indices to that information are stored in a pointer table 86.

Allocating more resources to planes with higher active neighboring voxels may enable 1.5-2× more Rulebook pencils to be accommodated in the same size of memory internal to the SSpNNA. As already noted, rulebook types Input-to-Output (i2o) and Output-to-Input (o2i) may be selected dynamically based on the application. The illustrated index-based storage mechanism enables both rulebook types to be scheduled by interchanging the data at the output of index queues 76a, 76c (FIG. 5), keeping the entire WAVES design the same for both RB types. For N-dimensional problems, WAVES may operate on a fixed tile size of weight planes and still be able to support complete end-to-end requirements. Additionally, there is no drop in the utilization for dense workloads (e.g., all bits set in weight bitmask) and WAVES supports the solution without any modifications.

Figure 7:
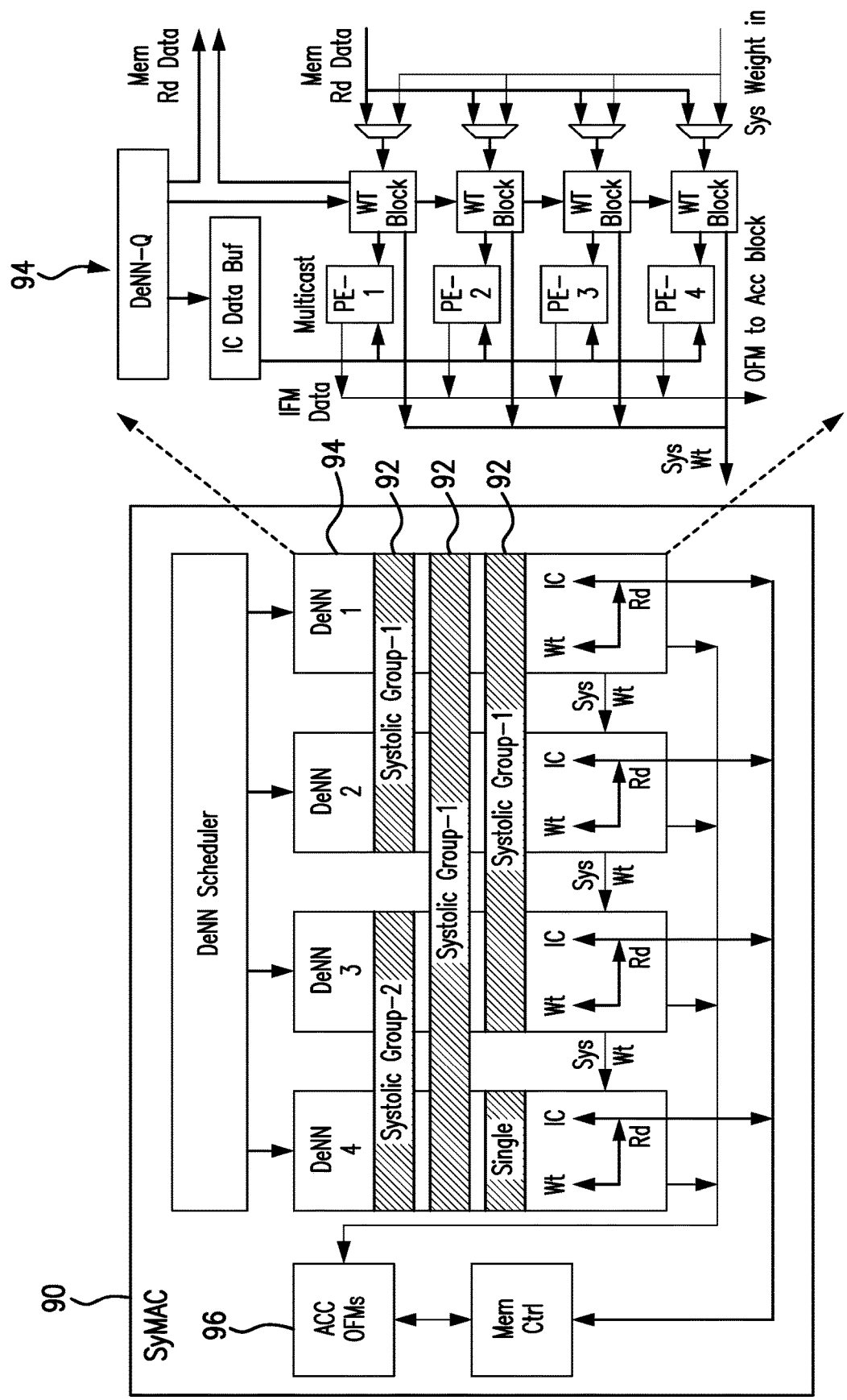
FIG. 7 is a block diagram of an example of systolic and multicast based multiply-accumulate computation (MAC) hardware according to an embodiment.

FIG. 7 shows a SyMAC compute block 90 that is capable of operating on different systolic groups 92. The SyMAC compute block 90 may be readily substituted for the SyMAC compute block 60 (FIG. 4), already discussed. In an embodiment, the systolic group selection is done dynamically, and the scheduler always attempts to form a group with larger DeNNs to reduce weight requests to L1. At a weight plane boundary where enough tuples are not available to form a larger systolic group, the next weight plane is scheduled as another group. All processing elements (PEs) in a DeNN block 94 work in tandem on the same IFM and respective weights performing four 32-bit floating point MACs as pipelined operations to produce partial OFM data. All data buses may be 128-bit wide to accommodate, for example, four IEEE754 Full Floating-point numbers. In an embodiment, each DeNN block 94 has a DeNN-Q with a queue to buffer data before resources are ready for dispatch. Each DeNN-Q may also schedule memory fetches for IFM and weight data. IC data buffer (e.g., recirculating buffer) and weight (WT) blocks may contain logic to place memory requests and buffer the data before scheduling to a PE. With an increase in the OC (output channel) value, IFM data in the IC data buffer may be reused multiple times and with an increase in the IC (Input channel) value, the rate of local accumulations of partial data increases as PEs are working on the same OFM. These modes may be automatically enabled based on the values of IC and OC. These design choices increase internal data reuse and reduce L1 accesses.

An accumulate (ACC) OFMs block 96 may accumulate partial OFMs generated from multiple DeNNs, performing tag lookups to find overlapping OFMs and merging the overlapping OFMs locally. In an embodiment, the ACC OFMs block 96 also requests for the relevant OFM from memory to be merged with the generated OFM. A four DeNN configuration with four PEs per DeNN computes four elements per PE per cycle, enabling the SSpNNA to support 64-MUL operations per cycle. Changing the SSpNNA configuration to eight DeNNs, working in two systolic groups of 4-DeNN each doubles performance to 128 MUL operations per cycle, and does not require any additional memory ports for weights.

The SSpNNA accelerates N-Dimension sparse processing compared to any available solutions and pushes the overall utilization of compute resources to approximately 90%. This HWA may be used as standalone accelerator or a coprocessor, for which the below instruction may be used to drive the SSpNNA hardware.

The new instruction is: SSXRBLNIFMOF "Spatial Sparse with 'X' Rule Book lines having 'N' input Feature and 'M' Output Feature". Where 'X' indicates number of rulebooks lines to be processed, and 'N' and 'M' represent input feature size and output feature size, respectively. For example, if there are thirty-two rulebook lines to be processed with sixteen input and output feature maps, the instruction is SS32RBL16IF16OF. The size of IFM and OFM may remain the same for the entire rulebook and may be a multiple of four to match memory bandwidth.

In an embodiment, the format of the instruction is: SSXRBLNIFMOF tsrcdest, tsrc1, tsrc2, tsrc3, where tsrcdest points to the OFM base address for reading and writing back the partial/processed data, tsrc1 represents the base address of rule_book line, and tsrc2 and tsrc3 represents base address of IFM and OFM respectively.

Figure 8:
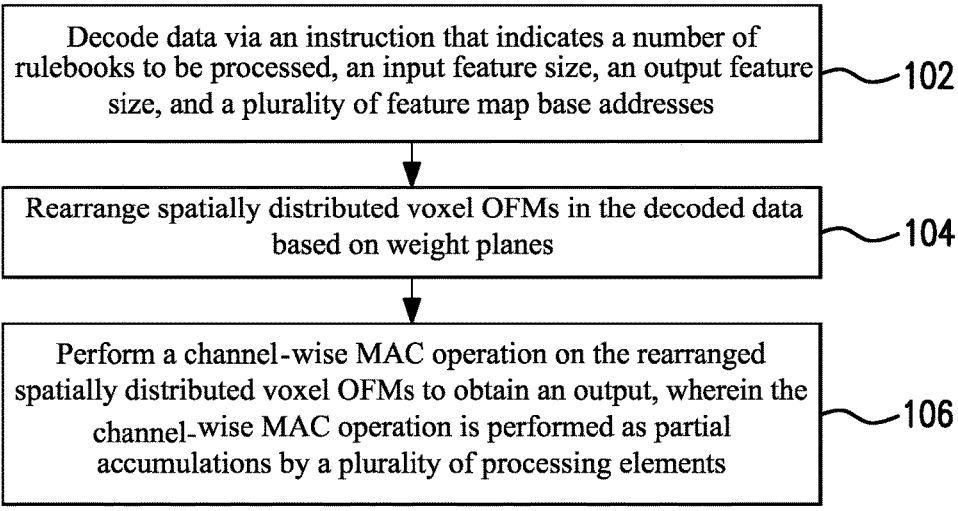
FIG. 8 is a flowchart of an example of a method of operating a performance-enhanced computing system according to an embodiment.

FIG. 8 shows a method 100 of operating a performance-enhanced computing system. The method 100 may generally be implemented in a hardware accelerator such as, for example, the HWA 50 (FIG. 4), already discussed. More particularly, the method 100 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 100 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 102 decodes data via an instruction that indicates a number of rulebooks to be processed, an input feature size, an output feature size, and a plurality of feature map base addresses. In an embodiment, block 104 rearranges spatially distributed voxel OFMs in the decoded data based on weight planes. In one example, block 104 arranges OFMs based on a least significant bit (LSB) hashing of the OFM address. Thus, even though the processing elements may be executing in any order, once the next block is reached, the OFMs are first rearranged based on the hash value (e.g., LSB bits) and then based on the corresponding channel in which the OFMs will be accumulated.

Block 106 performs a channel-wise MAC operation on the rearranged spatially distributed voxel OFMs to obtain an output, wherein the channel-wise MAC operation is performed as partial accumulations by a plurality of processing elements in the computing system. In an embodiment, block 106 allocates the plurality of processing elements based on the sparsity of the data. Additionally, the channel-wise MAC operation may identify (e.g., via tag lookups) overlapping OFMs and merge the overlapping OFMs locally (e.g., rather than globally). The illustrated method 100 enhances performance at least to the extent that the instruction facilitates more seamless and efficient execution, rearranging the spatially distributed voxels based on weight planes decreases compute and memory requirements and/or performing the channel-wise MAC operation as partial accumulations by a plurality of processing elements increases the number of operations per cycle.

Figure 9:
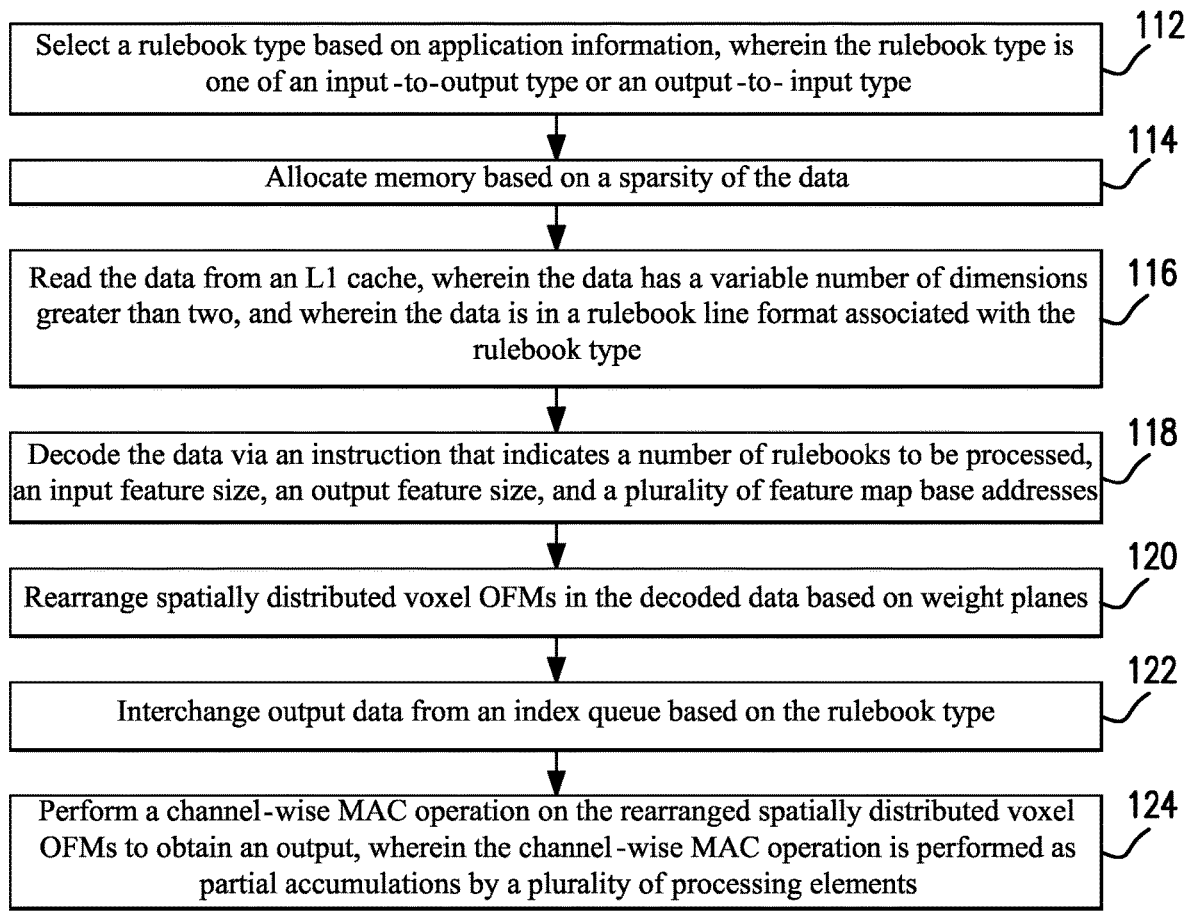
FIG. 9 is a flowchart of an example of a more detailed method of operating a performance-enhanced computing system according to an embodiment.

FIG. 9 shows a more detailed method 110 of operating a performance-enhanced computing system. The method 110 may generally be implemented in a hardware accelerator such as, for example, the HWA 50 (FIG. 4), already discussed. More particularly, the method 110 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 112 selects a rulebook type based on application information, wherein the rulebook type is one of an i2o type or an o2i type. Block 114 may allocate memory based on a sparsity of the data. For example, block 114 may provide for the dynamic allocation of smaller chunks of memory based on sparsity, which may help accommodate approximately 1.5× more rulebook lines relative to storage mapped as fixed resources per weight plane. In an embodiment, block 116 reads the data from an L1 cache, wherein the data has a variable number of dimensions greater than two, and wherein the data is in a rulebook line format associated with the rulebook type. Block 116 therefore enables the architecture to process weight planes hierarchically, by selecting a few planes at a time based on functional block area budget. In one example, block 118 decodes the data via an instruction that indicates a number of rulebooks to be processed, an input feature size, an output feature size, and a plurality of feature map base addresses.

Moreover, block 120 may rearrange spatially distributed voxel OFMs in the decoded data based on weight planes. In an embodiment, block 122 interchanges output data from an index queue based on the rulebook type. Block 122 therefore enables both i2o type and o2i type rulebooks to be scheduled with the same scheduler architecture. Illustrated block 124 performs a channel-wise MAC operation on the rearranged spatially distributed voxel OFMs to obtain an output, wherein the channel-wise MAC operation is performed as partial accumulations by a plurality of processing elements. Accordingly, blocks 112, 114, 116 and 122 further enhance performance.

Figure 10:
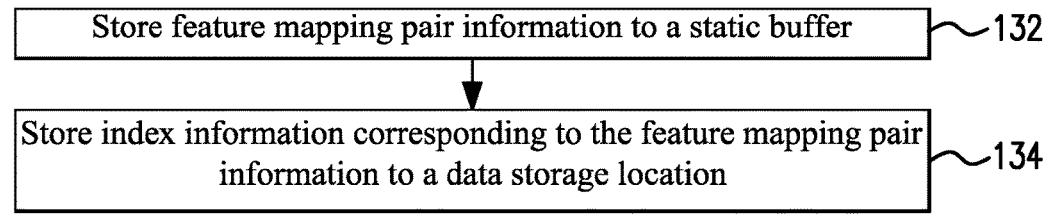
FIG. 10 is a flowchart of an example of a method of managing feature storage according to an embodiment.

FIG. 10 shows a method 130 of managing feature storage. The method 130 may generally be implemented in a hardware accelerator such as, for example, the HWA 50 (FIG. 4), already discussed. More particularly, the method 130 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 132 provides for storing feature pair information (e.g., IFM-OFM) to a static buffer. In an embodiment, block 134 stores index information corresponding to the feature mapping pair information to a data storage location. The method 130 may significantly reduce the width of storage used.

Figure 11:
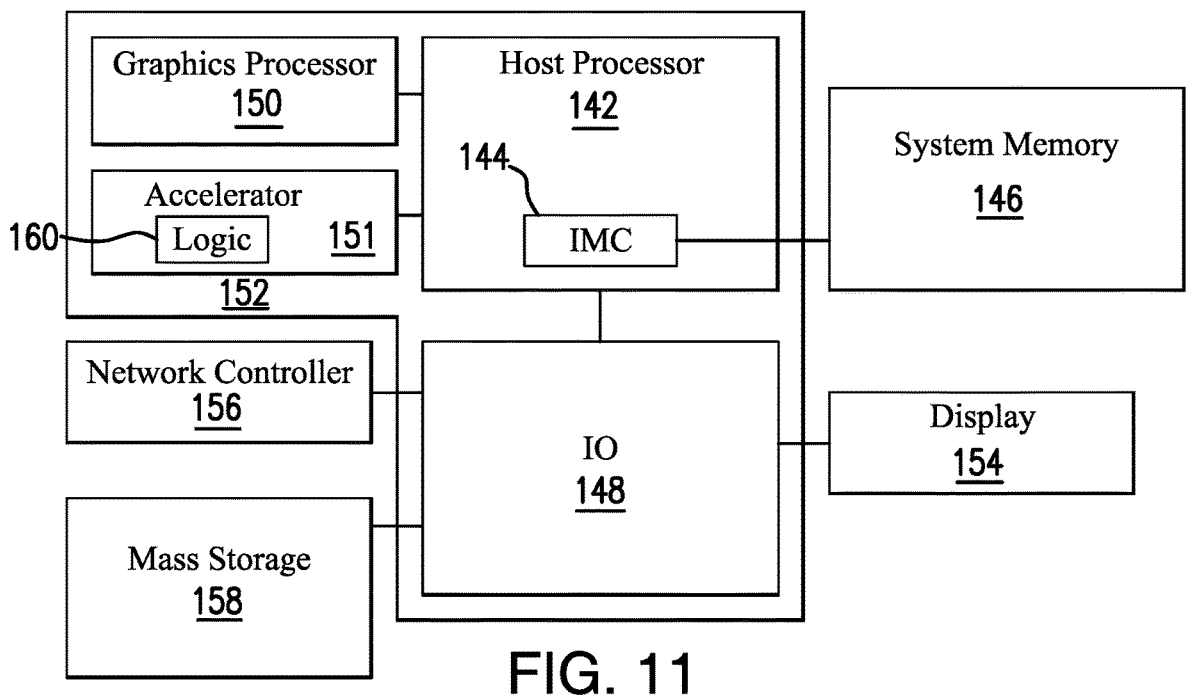
FIG. 11 is a block diagram of an example of a performance-enhanced computing system according to an embodiment.

Turning now to FIG. 11, a performance-enhanced computing system 140 is shown. The system 140 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 140 includes a host processor 142 (e.g., central processing unit/CPU) having an integrated memory controller (IMC) 144 that is coupled to a system memory 146.

The illustrated system 140 also includes an input output (IO) module 148 implemented together with the host processor 142, an accelerator 151 and a graphics processor 150 (e.g., graphics processing unit/GPU) on a semiconductor die 152 as a system on chip (SoC). The illustrated IO module 148 communicates with, for example, a display 154 (e.g., touch screen, liquid crystal display/LCD, light emitting diode/LED display), a network controller 156 (e.g., wired and/or wireless), and mass storage 158 (e.g., hard disk drive/HDD, optical disk, solid state drive/SSD, flash memory).

In an embodiment, the accelerator 151 includes logic 160 (e.g., logic instructions, configurable logic, fixed-functionality hardware logic, etc., or any combination thereof) to perform one or more aspects of the method 100 (FIG. 8), the method 110 (FIG. 9) and/or the method 130 (FIG. 10), already discussed. Thus, the logic 160 may decode data via an instruction that indicates a number of rulebooks to be processed, an input feature size, an output feature size, and a plurality of feature map base addresses. The logic 160 may also rearrange spatially distributed voxel output feature maps in the decoded data based on weight planes and perform a channel-wise MAC operation on the rearranged spatially distributed voxel output feature maps to obtain an output. In an embodiment, the channel-wise MAC operation is performed as partial accumulations by a plurality of processing elements in the accelerator 151, the host processor 142, the graphics processor 150, the IO module 148 and/or the semiconductor die 152.

The computing system 140 is considered performance-enhanced at least to the extent that the instruction facilitates more seamless and efficient execution, rearranging the spatially distributed voxels based on weight planes decreases compute and memory requirements and/or performing the channel-wise MAC operation as partial accumulations by a plurality of processing elements increases the number of operations per cycle.

Figure 12:
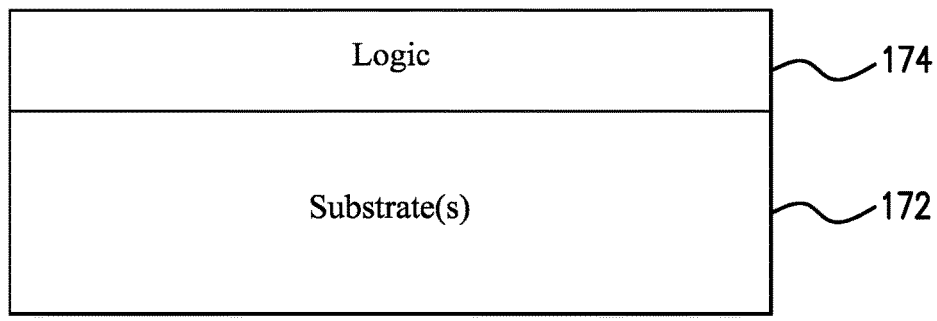
FIG. 12 is an illustration of an example of a semiconductor apparatus according to an embodiment.

FIG. 12 shows a semiconductor package apparatus 170. The illustrated apparatus 170 includes one or more substrates 172 (e.g., silicon, sapphire, gallium arsenide) and logic 174 (e.g., transistor array and other integrated circuit/IC components) coupled to the substrate(s) 172. The logic 174 may be implemented at least partly in configurable logic or fixed-functionality logic hardware. In one example, the logic 174 implements one or more aspects of the method 100 (FIG. 8), the method 110 (FIG. 9) and/or the method 130 (FIG. 10), already discussed. Thus, the logic 174 may decode data via an instruction that indicates a number of rulebooks to be processed, an input feature size, an output feature size, and a plurality of feature map base addresses. The logic 174 may also rearrange spatially distributed voxel output feature maps in the decoded data based on weight planes and perform a channel-wise MAC operation on the rearranged spatially distributed voxel output feature maps to obtain an output. In an embodiment, the channel-wise MAC operation is performed as partial accumulations by a plurality of processing elements in the logic 174 coupled to the one or more substrates 172.

The apparatus 170 is considered performance-enhanced at least to the extent that the instruction facilitates more seamless and efficient execution, rearranging the spatially distributed voxels based on weight planes decreases compute and memory requirements and/or performing the channel-wise MAC operation as partial accumulations by a plurality of processing elements increases the number of operations per cycle.

In one example, the logic 174 includes transistor channel regions that are positioned (e.g., embedded) within the substrate(s) 172. Thus, the interface between the logic 174 and the substrate(s) 172 may not be an abrupt junction. The logic 174 may also be considered to include an epitaxial layer that is grown on an initial wafer of the substrate(s) 172.

Figure 13:
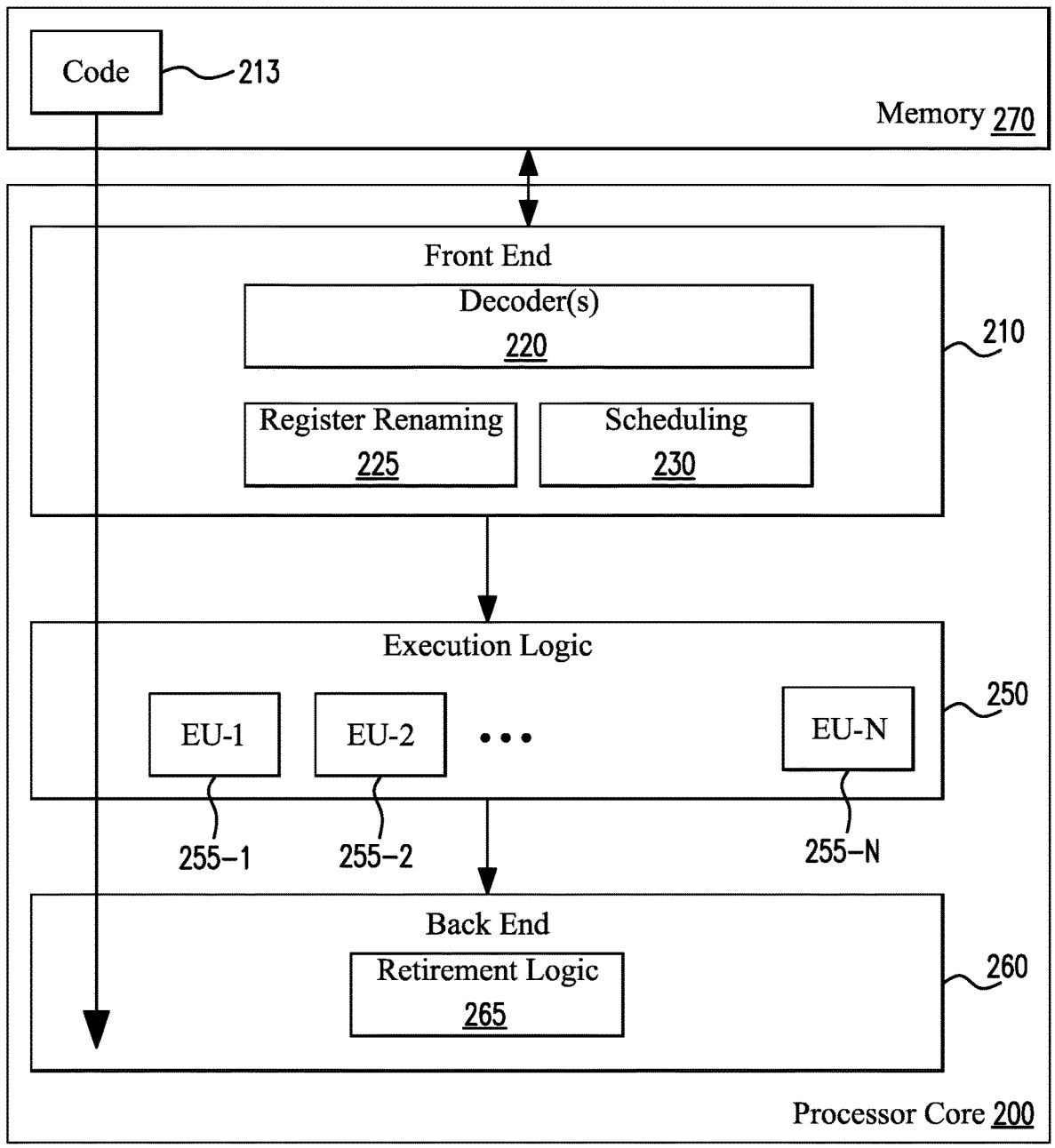
FIG. 13 is a block diagram of an example of a processor according to an embodiment.

FIG. 13 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 13, a processing element may alternatively include more than one of the processor core 200 illustrated in FIG. 13. The processor core 200 may be a single-threaded core or, for at least one embodiment, the processor core 200 may be multithreaded in that it may include more than one hardware thread context (or "logical processor") per core.

FIG. 13 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 100 (FIG. 8), the method 110 (FIG. 9) and/or the method 130 (FIG. 10), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 13, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 14:
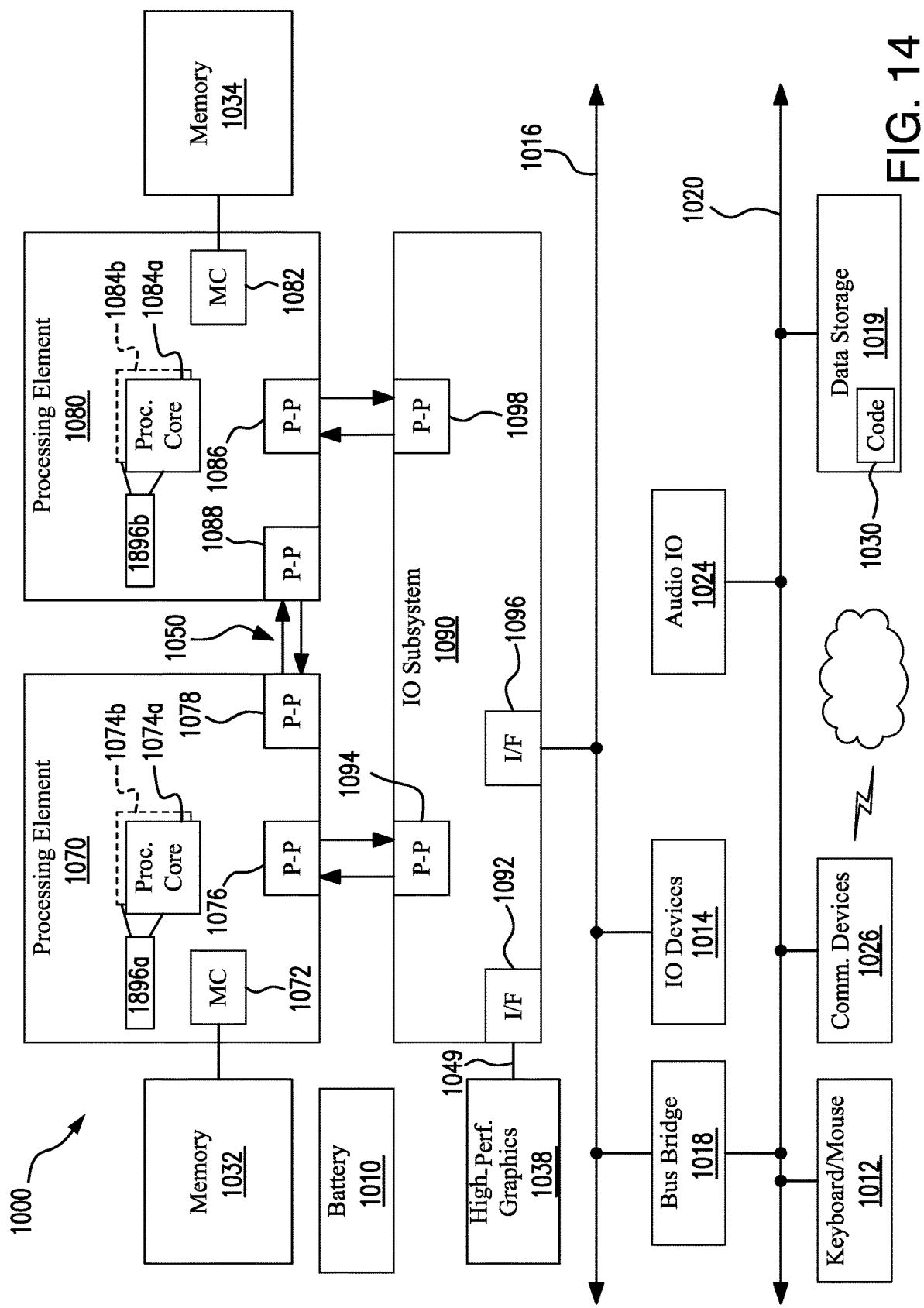
FIG. 14 is a block diagram of an example of a multi-processor based computing system according to an embodiment.

Referring now to FIG. 14, shown is a block diagram of a computing system 1000 embodiment in accordance with an embodiment. Shown in FIG. 14 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 14 may be implemented as a multi-drop bus rather than point-to-point interconnect.

As shown in FIG. 14, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 13.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 14, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 14, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 14, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 100 (FIG. 8), the method 110 (FIG. 9) and/or the method 130 (FIG. 10), already discussed. Further, an audio I/O 1024 may be coupled to second bus 1020 and a battery 1010 may supply power to the computing system 1000.

Note that other embodiments are contemplated. For example, instead of the point-to-point architecture of FIG. 14, a system may implement a multi-drop bus or another such communication topology. Also, the elements of FIG. 14 may alternatively be partitioned using more or fewer integrated chips than shown in FIG. 14.

Additional Notes and Examples

Example 1 includes a performance-enhanced computing system comprising a network controller, a processor coupled to the network controller, and a memory coupled to the processor, the memory including a set of executable program instructions, which when executed by the processor, cause the computing system to decode data via an instruction that indicates a number of rulebooks to be processed, an input feature size, an output feature size, and a plurality of feature map base addresses, rearrange spatially distributed voxel output feature maps in the decoded data based on weight planes, and perform a channel-wise multiply-accumulate (MAC) operation on the rearranged spatially distributed voxel output feature maps to obtain an output, wherein the channel-wise MAC operation is performed as partial accumulations by a plurality of processing elements in the processor.

Example 2 includes the computing system of Example 1, wherein the set of executable program instructions, when executed, further cause the computing system to select a rulebook type based on application information, and wherein the rulebook type is one of an input-to-output type or an output-to-input type.

Example 3 includes the computing system of Example 2, wherein the set of executable program instructions, when executed, further cause the computing system to read the data from a level one (L1) cache, wherein the data has a variable number of dimensions greater than two, and wherein the data is in a rulebook line format associated with the rulebook type.

Example 4 includes the computing system of Example 2, wherein the set of executable program instructions, when executed, further cause the computing system to interchange output data from an index queue based on the rulebook type.

Example 5 includes the computing system of Example 1, wherein the set of executable program instructions, when executed, further cause the computing system to allocate memory and the plurality of processing elements based on a sparsity of the data, and wherein the channel-wise MAC operation is to identify overlapping output feature maps and merge the overlapping output feature maps locally.

Example 6 includes the computing system of any one of Examples 1 to 5, further including a static buffer and a data storage, wherein the set of executable program instructions, when executed, further cause the computing system to store feature mapping pair information to the static buffer, and store index information corresponding to the feature mapping pair information to a location in the data storage.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to decode data via an instruction that indicates a number of rulebooks to be processed, an input feature size, an output feature size, and a plurality of feature map base addresses, rearrange spatially distributed voxel output feature maps in the decoded data based on weight planes, and perform a channel-wise multiply-accumulate (MAC) operation on the rearranged spatially distributed voxel output feature maps to obtain an output, wherein the channel-wise MAC operation is performed as partial accumulations by a plurality of processing elements in the logic coupled to the one or more substrates.

Example 8 includes the apparatus of Example 7, wherein the logic coupled to the one or more substrates is to select a rulebook type based on application information, wherein the rulebook type is one of an input-to-output type or an output-to-input type.

Example 9 includes the apparatus of Example 8, wherein the logic coupled to the one or more substrates is to read the data from a level one (L1) cache, wherein the data has a variable number of dimensions greater than two, and wherein the data is in a rulebook line format associated with the rulebook type.

Example 10 includes the apparatus of Example 8, wherein the logic coupled to the one or more substrates is to interchange output data from an index queue based on the rulebook type.

Example 11 includes the apparatus of Example 7, wherein the logic coupled to the one or more substrates is to allocate memory and the plurality of processing elements based on a sparsity of the data, and wherein the channel-wise MAC operation is to identify overlapping output feature maps and merge the overlapping output feature maps locally.

Example 12 includes the apparatus of any one of Examples 7 to 11, wherein the logic coupled to the one or more substrates is to store feature mapping pair information to a static buffer, and store index information corresponding to the feature mapping pair information to a data storage location.

Example 13 includes the apparatus of any one of Examples 7 to 11, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to decode data via an instruction that indicates a number of rulebooks to be processed, an input feature size, an output feature size, and a plurality of feature map base addresses, rearrange spatially distributed voxel output feature maps in the decoded data based on weight planes, and perform a channel-wise multiply-accumulate (MAC) operation on the rearranged spatially distributed voxel output feature maps to obtain an output, wherein the channel-wise MAC operation is performed as partial accumulations by a plurality of processing elements in the computing system.

Example 15 includes the at least one computer readable storage medium of Example 14, wherein the set of executable program instructions, when executed, further cause the computing system to select a rulebook type based on application information, and wherein the rulebook type is one of an input-to-output type or an output-to-input type.

Example 16 includes the at least one computer readable storage medium of Example 15, wherein the set of executable program instructions, when executed, further cause the computing system to read the data from a level one (L1) cache, wherein the data has a variable number of dimensions greater than two, and wherein the data is in a rulebook line format associated with the rulebook type.

Example 17 includes the at least one computer readable storage medium of Example 15, wherein the set of executable program instructions, when executed, further cause the computing system to interchange output data from an index queue based on the rulebook type.

Example 18 includes the at least one computer readable storage medium of Example 14, wherein the set of executable program instructions, when executed, further cause the computing system to allocate memory and the plurality of processing elements based on a sparsity of the data, and wherein the channel-wise MAC operation is to identify overlapping output feature maps and merge the overlapping output feature maps locally.

Example 19 includes the at least one computer readable storage medium of any one of Examples 14 to 18, wherein the set of executable program instructions, when executed, further cause the computing system to store feature mapping pair information to a static buffer, and store index information corresponding to the feature mapping pair information to a data storage location.

Example 20 includes a method of operating a performance-enhanced computing system, the method comprising decoding data via an instruction that indicates a number of rulebooks to be processed, an input feature size, an output feature size, and a plurality of feature map base addresses, rearranging spatially distributed voxel output feature maps in the decoded data based on weight planes, and performing a channel-wise multiply-accumulate (MAC) operation on the rearranged spatially distributed voxel output feature maps to obtain an output, wherein the channel-wise MAC operation is performed as partial accumulations by a plurality of processing elements.

Example 21 includes the method of Example 20, further including selecting a rulebook type based on application information, wherein the rulebook type is one of an input-to-output type or an output-to-input type.

Example 22 includes the method of Example 21, further including reading the data from a level one (L1) cache, wherein the data has a variable number of dimensions greater than two, and wherein the data is in a rulebook line format associated with the rulebook type.

Example 23 includes the method of Example 21, further including interchanging output data from an index queue based on the rulebook type.

Example 24 includes the method of Example 20, further including allocating memory and the plurality of processing elements based on a sparsity of the data, and wherein the channel-wise MAC operation identifies overlapping output feature maps and merges the overlapping output feature maps locally.

Example 25 includes the method of any one of Examples 20 to 24, further including storing feature mapping pair information to a static buffer, and storing index information corresponding to the feature mapping pair information to a data storage location.

Example 26 includes means for performing the method of any one of Examples 20 to 25.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a network controller;
a processor coupled to the network controller; and
a memory coupled to the processor, the memory including a set of executable program instructions, which when executed by the processor, cause the computing system to:
decode data via an instruction that indicates a number of rulebooks to be processed, an input feature size, an output feature size, and a plurality of feature map base addresses,
rearrange spatially distributed voxel output feature maps in the decoded data based on weight planes, and
perform a channel-wise multiply-accumulate (MAC) operation on the rearranged spatially distributed voxel output feature maps to obtain an output, wherein the channel-wise MAC operation is performed as partial accumulations by a plurality of processing elements in the processor.

2. The computing system of claim 1, wherein the set of executable program instructions, when executed, further cause the computing system to select a rulebook type based on application information, and wherein the rulebook type is one of an input-to-output type or an output-to-input type.

3. The computing system of claim 2, wherein the set of executable program instructions, when executed, further cause the computing system to read the data from a level one (L1) cache, wherein the data has a variable number of dimensions greater than two, and wherein the data is in a rulebook line format associated with the rulebook type.

4. The computing system of claim 2, wherein the set of executable program instructions, when executed, further cause the computing system to interchange output data from an index queue based on the rulebook type.

5. The computing system of claim 1, wherein the set of executable program instructions, when executed, further cause the computing system to allocate memory and the plurality of processing elements based on a sparsity of the data, and wherein the channel-wise MAC operation is to identify overlapping output feature maps and merge the overlapping output feature maps locally.

6. The computing system of claim 1, further including a static buffer and a data storage, wherein the set of executable program instructions, when executed, further cause the computing system to:
store feature mapping pair information to the static buffer; and
store index information corresponding to the feature mapping pair information to a location in the data storage.

7. A semiconductor apparatus comprising:
one or more substrates; and
logic coupled to the one or more substrates, wherein the logic is implemented at least partly in one or more of configurable logic or fixed-functionality logic hardware, the logic coupled to the one or more substrates to:
decode data via an instruction that indicates a number of rulebooks to be processed, an input feature size, an output feature size, and a plurality of feature map base addresses;
rearrange spatially distributed voxel output feature maps in the decoded data based on weight planes; and
perform a channel-wise multiply-accumulate (MAC) operation on the rearranged spatially distributed voxel output feature maps to obtain an output, wherein the channel-wise MAC operation is performed as partial accumulations by a plurality of processing elements in the logic coupled to the one or more substrates.

8. The apparatus of claim 7, wherein the logic coupled to the one or more substrates is to select a rulebook type based on application information, wherein the rulebook type is one of an input-to-output type or an output-to-input type.

9. The apparatus of claim 8, wherein the logic coupled to the one or more substrates is to read the data from a level one (L1) cache, wherein the data has a variable number of dimensions greater than two, and wherein the data is in a rulebook line format associated with the rulebook type.

10. The apparatus of claim 8, wherein the logic coupled to the one or more substrates is to interchange output data from an index queue based on the rulebook type.

11. The apparatus of claim 7, wherein the logic coupled to the one or more substrates is to allocate memory and the plurality of processing elements based on a sparsity of the data, and wherein the channel-wise MAC operation is to identify overlapping output feature maps and merge the overlapping output feature maps locally.

12. The apparatus of claim 7, wherein the logic coupled to the one or more substrates is to:
store feature mapping pair information to a static buffer; and
store index information corresponding to the feature mapping pair information to a data storage location.

13. The apparatus of claim 7, wherein the logic coupled to the one or more substrates includes transistor channel regions that are positioned within the one or more substrates.

14. At least one non-transitory computer readable storage medium comprising a set of executable program instructions, which when executed by a computing system, cause the computing system to:
decode data via an instruction that indicates a number of rulebooks to be processed, an input feature size, an output feature size, and a plurality of feature map base addresses;
rearrange spatially distributed voxel output feature maps in the decoded data based on weight planes; and
perform a channel-wise multiply-accumulate (MAC) operation on the rearranged spatially distributed voxel output feature maps to obtain an output, wherein the channel-wise MAC operation is performed as partial accumulations by a plurality of processing elements in the computing system.

15. The at least one non-transitory computer readable storage medium of claim 14, wherein the set of executable program instructions, when executed, further cause the computing system to select a rulebook type based on application information, and wherein the rulebook type is one of an input-to-output type or an output-to-input type.

16. The at least one non-transitory computer readable storage medium of claim 15, wherein the set of executable program instructions, when executed, further cause the computing system to read the data from a level one (L1) cache, wherein the data has a variable number of dimensions greater than two, and wherein the data is in a rulebook line format associated with the rulebook type.

17. The at least one non-transitory computer readable storage medium of claim 15, wherein the set of executable program instructions, when executed, further cause the computing system to interchange output data from an index queue based on the rulebook type.

18. The at least one non-transitory computer readable storage medium of claim 14, wherein the set of executable program instructions, when executed, further cause the computing system to allocate memory and the plurality of processing elements based on a sparsity of the data, and wherein the channel-wise MAC operation is to identify overlapping output feature maps and merge the overlapping output feature maps locally.

19. The at least one non-transitory computer readable storage medium of claim 14, wherein the set of executable program instructions, when executed, further cause the computing system to:
store feature mapping pair information to a static buffer; and
store index information corresponding to the feature mapping pair information to a data storage location.

20. A method comprising:
decoding data via an instruction that indicates a number of rulebooks to be processed, an input feature size, an output feature size, and a plurality of feature map base addresses;
rearranging spatially distributed voxel output feature maps in the decoded data based on weight planes; and
performing a channel-wise multiply-accumulate (MAC) operation on the rearranged spatially distributed voxel output feature maps to obtain an output, wherein the channel-wise MAC operation is performed as partial accumulations by a plurality of processing elements.

21. The method of claim 20, further including selecting a rulebook type based on application information, wherein the rulebook type is one of an input-to-output type or an output-to-input type.

22. The method of claim 21, further including reading the data from a level one (L1) cache, wherein the data has a variable number of dimensions greater than two, and wherein the data is in a rulebook line format associated with the rulebook type.

23. The method of claim 21, further including interchanging output data from an index queue based on the rulebook type.

24. The method of claim 20, further including allocating memory and the plurality of processing elements based on a sparsity of the data, and wherein the channel-wise MAC operation identifies overlapping output feature maps and merges the overlapping output feature maps locally.

25. The method of claim 20, further including:
storing feature mapping pair information to a static buffer; and
storing index information corresponding to the feature mapping pair information to a data storage location.

* * * * *